(12) United States Patent
Ansari et al.

(10) Patent No.: US 7,730,244 B1
(45) Date of Patent: Jun. 1, 2010

(54) TRANSLATION OF COMMANDS IN AN INTERCONNECTION OF AN EMBEDDED PROCESSOR BLOCK CORE IN AN INTEGRATED CIRCUIT

(75) Inventors: Ahmad R. Ansari, San Jose, CA (US); Jeffery H. Appelbaum, San Mateo, CA (US); Kam-Wing Li, San Jose, CA (US); James J. Murray, Los Gatos, CA (US)

(73) Assignee: XILINX, Inc., San Jose, CA (US)

( * ) Notice: Subject to any disclaimer, the term of this patent is extended or adjusted under 35 U.S.C. 154(b) by 126 days.

(21) Appl. No.: 12/057,314

(22) Filed: Mar. 27, 2008

(51) Int. Cl.
*G06F 13/00* (2006.01)
(52) U.S. Cl. .............. 710/107; 710/5; 710/35; 711/150; 711/154; 370/462
(58) Field of Classification Search .......... 710/5, 710/35, 107, 307, 317; 711/150, 154; 370/462
See application file for complete search history.

(56) References Cited

U.S. PATENT DOCUMENTS

| | | | | |
|---|---|---|---|---|
| 5,255,378 | A * | 10/1993 | Crawford et al. | 710/307 |
| 5,584,033 | A * | 12/1996 | Barrett et al. | 710/105 |
| 5,689,659 | A * | 11/1997 | Tietjen et al. | 710/307 |
| RE36,052 | E * | 1/1999 | Kobayashi et al. | 710/307 |
| 6,321,310 | B1 * | 11/2001 | McCarthy et al. | 711/154 |
| 6,397,287 | B1 * | 5/2002 | Brown et al. | 710/305 |
| 6,463,483 | B1 * | 10/2002 | Imperiali | 710/35 |
| 6,526,462 | B1 * | 2/2003 | Elabd | 710/242 |
| 6,549,961 | B1 * | 4/2003 | Kloth | 710/36 |
| 6,766,385 | B2 * | 7/2004 | Dodd et al. | 710/35 |
| 6,868,459 | B1 * | 3/2005 | Stuber | 710/35 |
| 6,917,995 | B2 * | 7/2005 | Hirose et al. | 710/107 |
| 7,031,337 | B2 * | 4/2006 | Martin San Juan | 370/462 |
| 7,058,750 | B1 * | 6/2006 | Rankin et al. | 710/317 |
| 7,334,061 | B2 * | 2/2008 | Raju et al. | 710/35 |

(Continued)

OTHER PUBLICATIONS

Choi et al. Implementation of an On-Chip Bus Bridge between Hetereogeneous Buses with Different Clock Frequencies. Proceedings of the 9th International Database Engineering & Application Symposium. IEEE. 2005.*

(Continued)

*Primary Examiner*—Mark Rinehart
*Assistant Examiner*—Matthew D Spittle
(74) *Attorney, Agent, or Firm*—W. Eric Webostad; John J. King

(57) ABSTRACT

Command translation of burst commands is described. A slave processor local bus ("PLB") bridge, part of a processor block core embedded in a host IC, has a data size threshold to allow access to a crossbar switch device. A master device, coupled to the slave PLB bridge, has any of a plurality of command bus widths. A burst command is issued via a command bus, having a command bus width of the plurality, from the master device for the slave PLB bridge. The burst command is converted to a native bus width of the slave processor logic block if the command bus width is not equal to the native bus width. The burst command is translated if execution of the burst command will exceed the data size threshold and passed without the translating if the execution of the burst command will not exceed the data size threshold.

19 Claims, 6 Drawing Sheets

U.S. PATENT DOCUMENTS

| | | | | |
|---|---|---|---|---|
| 7,447,805 | B2* | 11/2008 | Braun et al. | 710/5 |
| 7,475,168 | B2* | 1/2009 | Weber et al. | 710/35 |
| 2002/0184453 | A1* | 12/2002 | Hughes et al. | 711/150 |
| 2007/0162654 | A1* | 7/2007 | Miwa | 710/35 |
| 2008/0086577 | A1* | 4/2008 | Huang | 710/35 |
| 2008/0235415 | A1* | 9/2008 | Clark et al. | 710/105 |

OTHER PUBLICATIONS

IBM Corporation. IBM CoreConnect bus cores. Data Sheet. 2006.*

XILINX, Inc. PLBV46 to DCR Bridge. Version 1.00a. Data Sheet. Apr. 12, 2007.*

IBM Corporation. Attaching PowerPC 405 Core to PLB Crossbar Arbiter. Application Note. Sep. 2009.*

UG200 (v1.1), "Embedded Processor Block in Virtex-5 FPGAs", Mar. 31, 2008, 327 pages, Xilinx, Inc. 2100 Logic Drive, San Jose, CA 95124.

U.S. Appl. No. 12/043,097, filed Mar. 5, 2008, Ansari, Ahmad R., et al., entitled "A Processor Block Asic Core for Embedding in an Integrated Circuit", Xilinx, Inc. 2100 Logic Drive, San Jose, California 95124.

IBM Doc. No. SA-14-2538-04, "128-bit Processor Local Bus Architecture Specifications", Ver. 4.6, Jul. 2004, 184 pages.

UG200 (v1.0), "Embedded Processor Block in Virtex-5 FPGAs", Jan. 15, 2008, 323 pages, Xilinx, Inc. 2100 Logic Drive, San Jose, CA 95124.

* cited by examiner

TRANSLATION OF COMMANDS IN AN INTERCONNECTION OF AN EMBEDDED PROCESSOR BLOCK CORE IN AN INTEGRATED CIRCUIT

FIELD OF THE INVENTION

The invention relates to integrated circuit devices ("ICs"). More particularly, one or more aspects generally relate to translation of commands in an interconnection of a processor block core embedded in an IC.

BACKGROUND OF THE INVENTION

Programmable logic devices ("PLDs") are a well-known type of integrated circuit that can be programmed to perform specified logic functions. One type of PLD, the field programmable gate array ("FPGA"), conventionally includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile conventionally includes both programmable interconnect and programmable logic. The programmable interconnect conventionally includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic conventionally may be programmed by loading a stream of configuration data into internal configuration memory cells that define how the programmable elements are configured. The configuration data can be read from memory (e.g., from an external non-volatile memory, such as flash memory or read-only memory) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is conventionally stored on-chip in non-volatile memory. In some CPLDs, configuration data is stored on-chip in non-volatile memory, then downloaded to volatile memory as part of an initial configuration ("programming") sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Conventionally, embedded processors are designed apart from the PLDs. Such embedded processors are generally not specifically designed for implementation in PLDs, and thus such embedded processors may have operating frequencies that significantly exceed a maximum operating frequency of programmable logic of such PLDs. Moreover, parameters such as latency, transistor gate delay, data throughput, and the like designed into the embedded processors may be assumed to be present in the environment to which the embedded processors are to be coupled. Thus even though a PLD may include an embedded processor, such one or more operating parameters of the embedded processor may be substantially disparate from those of programmable logic of the PLD.

For purposes of clarity by way of example and not limitation, an FPGA with an embedded processor is described; however, it should be appreciated that other PLDs, as well as other integrated circuits with programmable logic or other circuitry fabric with less performance than the embedded processor, may likewise be used in accordance with the following description.

Performance of a design instantiated in programmable logic of an FPGA ("FPGA fabric") coupled to an embedded processor may be significantly limited by disparity between operating parameters of the FPGA fabric and those of the embedded processor. Thus, if, as before, embedded processor interfaces such as processor local bus ("PLB") interfaces are brought directly out to FPGA fabric, disparity between respective operating parameters of the embedded processor and the FPGA fabric is a significant limitation with respect to overall performance. For example, operations between a memory controller instantiated in FPGA fabric and an embedded processor have heretofore been significantly bottlenecked due to having to wait on the slower memory controller.

Alternatively, to enhance performance, a memory controller instantiated in FPGA fabric may be hardened or provided as an ASIC core coupled to the embedded processor. By hardening a circuit instantiated in FPGA fabric, it is generally meant replacing or bypassing configuration memory cells with hardwired or dedicated connections. Even though the example of a memory controller is used, it should be understood that other peripherals may be hardened or provided as ASIC cores for coupling to an embedded processor. However, as the memory controller or peripheral ASIC or hardened core is not configurable, this reduces overall flexibility. For purposes of clarity by way of example and not limitation, ASIC cores are described even though hardened cores instantiated in FPGA fabric may also be used.

Semiconductor processes and semiconductor process integration rules ("semiconductor process design rules") associated with ASICs are generally more challenging, and thus yield for such ASICs may be relatively low as compared to yield of FPGAs of the same size. FPGAs, which may have a larger and longer run rate than ASICs, may employ semiconductor process design rules that are less aggressive but are more conducive to a higher die per wafer yield than that of ASICs.

It should be understood that an FPGA manufactured with an ASIC core uses FPGA semiconductor process design rules. Thus, ASIC cores manufactured in FPGAs perform worse than such ASIC cores manufactured as standalone ASICs using more aggressive ASIC semiconductor process design rules. Thus, manufacturing FPGAs with ASIC cores conventionally will not achieve competitive performance with standalone ASICs.

For FPGAs provided with ASIC cores that take the place of some FPGA fabric resources, users conventionally are locked into the particular offering of ASIC core memory controllers or peripherals, and have less flexibility of design due to fewer FPGA fabric resources for implementing their circuit design. This loss of flexibility combined with the fact that such ASIC core memory controllers or peripherals implemented in FPGA fabric may make FPGAs less attractive to users.

Accordingly, it would be desirable and useful to enhance performance of FPGAs without a significant loss of design flexibility associated with adding ASIC cores, such as memory controllers or peripherals.

SUMMARY OF THE INVENTION

One or more aspects generally relate to translation of commands with an interconnection of a processor block Application Specific Integrated Circuit ("ASIC") core embedded in an IC.

An aspect relates generally to a method for command translation. The method includes: having a slave processor local bus bridge as part of a processor block core that is embedded in a host integrated circuit; setting a data size threshold to allow access by the slave processor local bus bridge to a crossbar switch device of the processor block core; having a master device coupled to the slave processor local bus bridge, where the master device is capable of having any of a plurality of command bus widths; issuing a burst command via a command bus from the master device for receipt by the slave processor local bus bridge, where the command bus has a command bus width of the plurality of command bus widths; converting the burst command to a native bus width of the slave processor logic block if the command bus width is not equal to the native bus width; translating the burst command if execution of the burst command will exceed the data size threshold; and passing the burst command without the translating if the execution of the burst command will not exceed the data size threshold.

Another aspect relates generally to another method of command translation. The method includes: receiving a read burst command to a first processor block interface; obtaining a first read data size threshold to request access to a crossbar switch coupled to the first processor block interface; read command translating the read burst command into at least one read burst portion responsive to the read burst command exceeding the first read data size threshold; not read command translating the read burst command responsive to the read burst command not exceeding the first read data size threshold; determining if sufficient buffer space in association with the first processor block interface is available for completion of either the read burst command or the at least one read burst portion; if the buffer space is sufficient for completion of the read burst command, requesting access of the crossbar switch for execution of the read burst command via a second interface coupled to the crossbar switch; and if the buffer space is sufficient for completion of the at least one read burst portion, requesting access of the crossbar switch for execution of the at least one read burst portion via the second interface coupled the crossbar switch.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
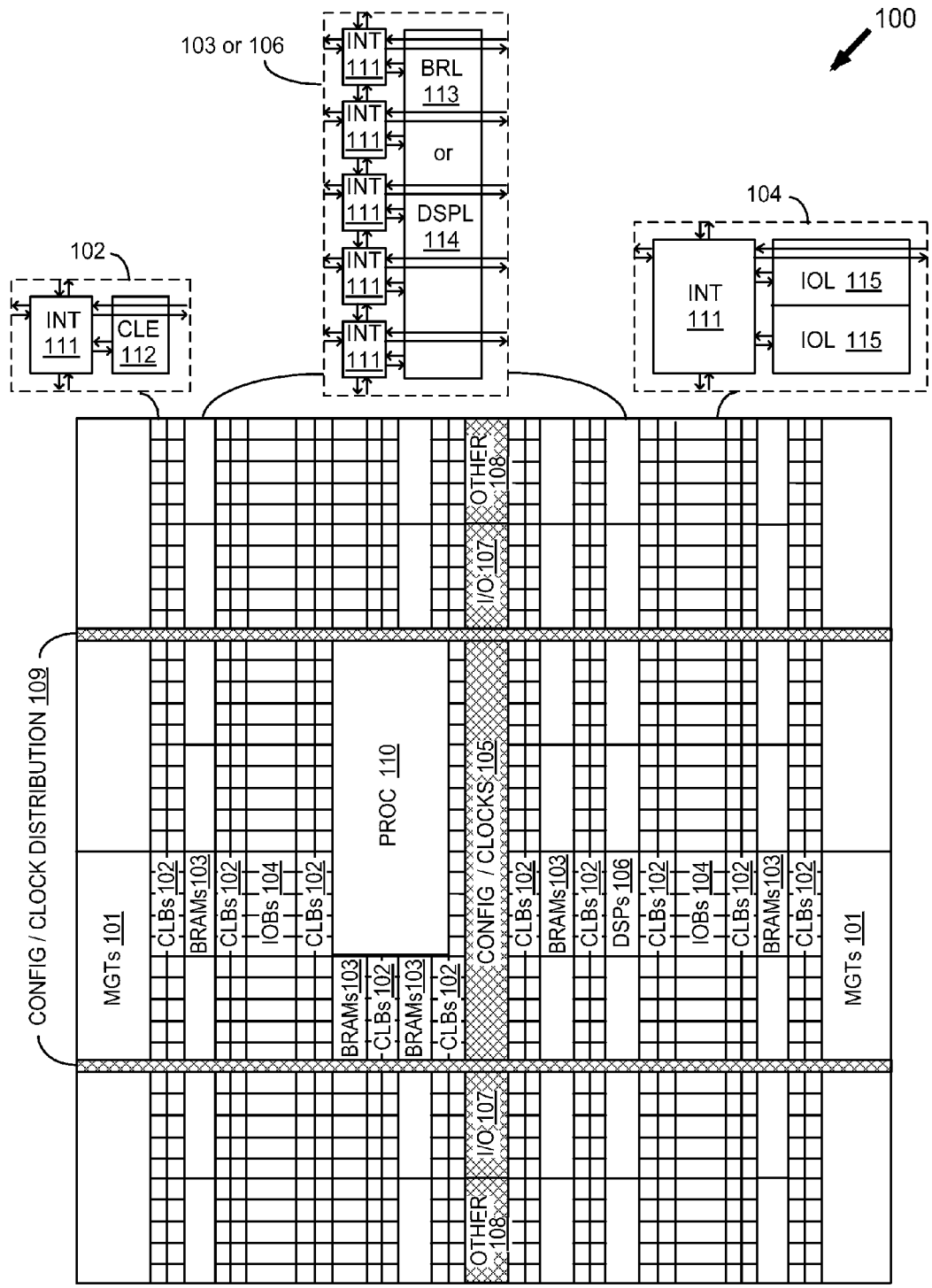
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

As FPGA designs increase in complexity, they reach a point at which the designer cannot deal with the entire design at the gate level. Where once a typical FPGA design comprised perhaps 5,000 gates, FPGA designs with over 100,000 gates are now common. To deal with this complexity, circuits are typically partitioned into smaller circuits that are more easily handled. Often, these smaller circuits are divided into yet smaller circuits, imposing on the design a multi-level hierarchy of logical blocks.

Libraries of pre-developed blocks of logic have been developed that can be included in an FPGA design. Such library modules include, for example, adders, multipliers, filters, and other arithmetic and DSP functions from which complex designs can be readily constructed. These pre-developed logic blocks are in the form of coded text that may be instantiated in programmable logic of the FPGA. The use of pre-developed logic blocks permits faster design cycles, by eliminating the redesign of duplicated circuits. Further, such blocks are typically well tested, thereby making it easier to develop a reliable complex design.

Thus, some FPGAs, such as the Virtex-5 FGPA available from Xilinx, Inc. of San Jose, Calif., can be programmed to incorporate pre-developed logic blocks with pre-designed functionalities, i.e., "soft cores". A soft core can include a predetermined set of configuration bits that program the FPGA to perform one or more functions. Alternatively, a soft core can include source code or schematics that describe the logic and connectivity of a design. Typical soft cores can provide, but are not limited to, DSP functions, memories, storage elements, and math functions. Some soft cores include an optimally floor-planned layout targeted to a specific family of FPGAs. Soft cores can also be parameterizable, i.e., allowing the user to enter parameters to activate or change certain soft core functionality.

A set or sets of configuration bits used to program programmable logic of an FPGA is conventionally referred to as a configuration bitstream. Programmable logic of an FPGA may include CLBs, PIPs, IOBs, or other programmably configurable logic blocks, interconnects, or inputs/outputs by a configuration bitstream. Register settings may be set via a configuration bitstream; however, hardwired registers are not programmable logic.

Moreover, a hardwired core, such as an ASIC core, is not a soft core. A soft core is instantiated in programmable logic after manufacture of an integrated circuit, whereas a hardwired core is manufactured as part of an integrated circuit. Furthermore, conventionally a hardwired core is thought of as having generally dedicated logic blocks, interconnects, and inputs/outputs, even though a portion of a hardwired core may be set to operate responsive to register settings.

Figure 2:
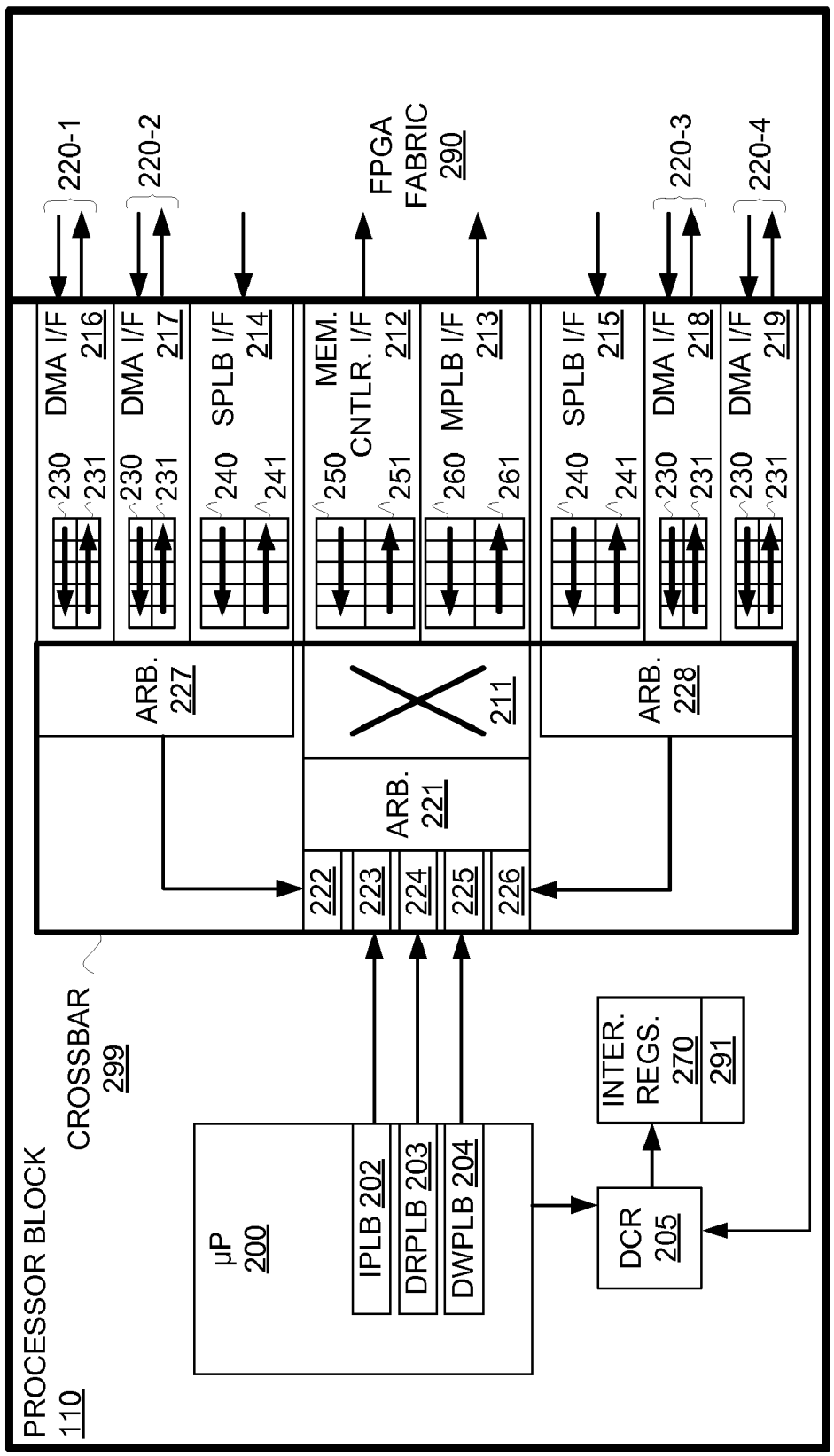
FIG. 2 is a block diagram depicting an exemplary embodiment of an ASIC processor block core ("processor block") that may be embedded in the FPGA of FIG. 1.

FIG. 2 is a block diagram depicting an exemplary embodiment of an ASIC processor block core ("processor block") 110. Processor block 110 includes an embedded microprocessor core, namely microprocessor 200, which is generally hardwired and designed apart from the FPGA, such as FPGA 100 of FIG. 1 in which processor block 110 may be located.

Microprocessor 200 in this exemplary embodiment includes an instruction processor local bus ("IPLB") 202, a data read PLB ("DRPLB") 203, and a data write PLB ("DWPLB") 204. In this exemplary embodiment, microprocessor 200 is a Power PC, or more particularly a 440 Power PC, available from IBM. However, from the following description, it should be appreciated that other types of microprocessors with other types of interfaces may be used. Moreover, from the following description, it should be appreciated that an ASIC core other than a microprocessor ASIC core may be used.

Components of processor block 110 are generally hardwired such that their performance exceeds that of programmable logic of FPGA fabric 290 to which processor block 110 is coupled. Processor block 110 includes registers, such as internal registers 270, which may be set in order to condition processor block 110 for any of a variety of user selectable configurations, as described below in additional detail.

A device control register block ("DCR") 205 may be coupled to microprocessor core 200 and may be part of processor block 110. DCR 205 may be used to provide settings to registers controlled by microprocessor core 200 or other registers subject to control by DCR block 205. DCR block 205 may be used to set registers of internal registers 270.

Arrows in FIG. 2 indicate the direction of a transaction. Thus, for example, register input provided to DCR 205 may be from a transaction initiated by microprocessor 200 or from another master device. One or more master devices, other than microprocessor 200, may be instantiated in FPGA fabric 290, may be other ASIC cores of FPGA 100, or may be external ICs coupled to FPGA 100, or any combination thereof. Such master devices external to processor block 110 may be coupled thereto via a direct memory access ("DMA") interface block, such as DMA interface blocks ("DMA interfaces") 216 through 219, or a slave PLB interface block ("SPLB interface"), such as SPLB interfaces 214 and 215, or a fabric interface to DCR 205. Thus, with respect to transaction origination, DMA interfaces 216 through 219 and SPLB interfaces 214 and 215 may generally be thought of as FPGA fabric 290-to-crossbar 299 bridges, and memory controller interface block ("memory controller interface") 212 and master PLB interface block ("MPLB interface") 213 may generally be thought of as crossbar 299-to-FPGA fabric 290 bridges.

Transactions may be initiated by microprocessor 200 as indicated by arrows respectively from IPLB 202, DRPLB 203, and DWPLB 204. However, it should be understood that a transaction issued by microprocessor 200 may result in data being provided to microprocessor 200 responsive to such an issued transaction.

A crossbar 299 is part of processor block 110. Crossbar 299 includes address decoder blocks ("decoders") 222 through 226, arbitration block ("arbiter") 221, crossbar switch ("switch") 211, and arbitration blocks ("arbiters") 227 and 228. IPLB 202, DRPLB 203, and DWPLB 204 are respectively coupled to decoders 223 through 225. Decoders 222 through 226 are respectively coupled to arbiter 221. Arbiter 221 is coupled to switch 211. Decoders 222 through 226 decode addresses associated with transactions, and transactions with decoded addresses are provided to arbiter 221 for arbitrating access to switch 211. The decoded addresses for transactions having been granted access to switch 211 are used to route such transactions to memory controller interface 212 or MPLB interface 213.

Memory controller interface 212 and MPLB interface 213 are both part of processor block 110. One or more of SPLB interfaces 214 and 215 are part of processor block 110, and one or more of DMA interfaces 216 through 219 may optionally be part of processor block 110.

Crossbar switch 211 is coupled to memory controller interface 212 and MPLB interface 213. Memory controller interface 212 may be coupled to FPGA fabric 290. Likewise, MPLB interface 213 may be coupled to FPGA fabric 290. Thus, for example, microprocessor 200 may issue an instruction transaction, a read transaction, or a write transaction which is respectively decoded by decoder 223, 224, or 225 to provide target addresses, which may be for either or both memory controller interface 212 or MPLB interface 213. A decoded address is used by switch 211 once access to switch 211 for such decoded address is granted by arbiter 221. Thus, switch 211 responsive to a decoded address provides such address for example to memory controller interface 212 to access a memory controller device coupled thereto or to MPLB interface 213 to access a peripheral device coupled thereto.

Memory controller interface 212 includes an inbound first-in, first-out buffer ("FIFO") 250 and an outbound FIFO 251. MPLB interface 213 includes an inbound FIFO 260 and an outbound FIFO 261. Each SPLB interface 214 and 215 includes a respective inbound FIFO 240 and an outbound FIFO 241 pair. Lastly, each DMA interface 216 through 219 includes a respective inbound FIFO 230 and outbound FIFO 231 pair. Thus, even though the direction of a transaction is directed to memory controller interface 212 or MPLB interface 213 such as originating from microprocessor 200 or FPGA fabric 290, it should be appreciated that data or other information flow associated with such a transaction may be in either or both input and output directions. Thus, crossbar 299 is bidirectional, as described below in additional detail.

Because processor block 110 is an ASIC core, blocks of processor block 110 that couple to microprocessor 200 may be tailored for interoperability as well as performance. Focusing on communication between microprocessor 200 and memory external to processor block 110, memory controller interface 212 is designed and implemented to operate at the rated speed of microprocessor 200. Moreover, because of hardwiring associated with an ASIC core, it should be appreciated that latency associated with signal propagation in crossbar 299 and memory controller interface 212 is substantially less than latency in FPGA fabric 290. In other words, by providing an ASIC core with memory controller interface 212 coupled to microprocessor 200, frequency of operation has been increased with a reduction in latency as compared with having microprocessor 200 directly coupled to FPGA fabric.

Moreover, handshaking conventionally associated with a bus layer of a memory controller has been incorporated into memory controller interface 212. Additionally, some functionality conventionally associated with a physical ("PHY") layer of a memory controller is incorporated into memory controller interface 212. Internal registers of internal registers 270 may be set to configure memory controller interface 212.

For purposes of clarity by way of example and not limitation, some numerical examples of bitwidths are provided. However, it should be understood that these or other bitwidths may be used as may vary from application to application.

If a user decides to burst 1, 4, 8, or 16 quad words at a time, where a word is 32 bits, memory controller interface 212 may be configured to output such quad word bursts. Within processor block 110, the data width of memory controller interface 212 is 128 bits; however, for communication with FPGA fabric 290, memory controller interface 212 interface to FPGA fabric 290 or otherwise external coupling with respect to processor block 110 is user selectable, such as for a 32-, 64-, or 128-bit wide interface. Variable bus sizing of memory controller interface 212 to FPGA fabric 290 is facilitated in part by a bus formed using PIPs of FPGA fabric 290. As shall be appreciated from the following description, any combination of 32-, 64-, and 128-bit soft buses associated with memory controller interface 212 and MPLB interface 213 may communicate with any 32-, 64-, and 128-bit soft buses associated with SPLB interfaces 214 and 215. Furthermore, memory controller interface 212 supports various clocking ratios with respect to frequency of microprocessor 200; examples of such microprocessor-to-memory controller interface clocking ratios may include 1:1, 4:3, 3:2, and 2:1.

Effectively, by providing FIFOs 250 and 251, memory controller interface 212 is a FIFO-like port which is clocked at the operating rate of microprocessor 200. There may be as little as a one clock cycle latency, subject to port availability, for sending a decoded address and transaction across crossbar 299 to memory controller interface 212. Likewise, this one clock cycle latency capability across crossbar 299 is applicable to all accesses to crossbar 299 subject to port availability, and is a latency of one clock cycle of a rated speed of operation of microprocessor 200.

Thus, a user design may instantiate a memory controller in FPGA fabric 290 according to the type of memory to be coupled to such memory controller as selected by the user. Accordingly, flexibility for a user design or selection of a memory controller instantiated in FPGA fabric 290 is maintained while performance is enhanced.

PLBs of microprocessor 200 are optionally extended to FPGA fabric via ASIC circuitry provided as one or more of SPLB interfaces 214 and 215 and a MPLB interface 213. However, this is not a mere extension of PLBs of microprocessor 200 because the ASIC circuitry is not merely an extension of wires, but performs additional functions.

MPLB interface 213 operates at a fraction of the rated speed of microprocessor 200, such as approximately one half to one quarter of such rated speed of microprocessor block 200. MPLB interface 213 therefore may load data into outbound FIFO 261 or unload data out of inbound FIFO 260 at the rated speed of microprocessor 200, but data loaded into inbound FIFO 260 and data unloaded from outbound FIFO 261 is at the rated speed of MPLB interface 213. For purposes of clarity by way of example and not limitation, it shall be assumed that the rated speed of operation of microprocessor 200 is approximately 400 to 550 MHz, and the speed of operation of MPLB interface 213 is approximately 133.3 to 183.3 MHz. The clock ratio of the frequency of microprocessor 200 frequency to that of MPLB interface 213 is generally an integer ratio. Frequency of MPLB interface 213, as well as SPLB interface 214 and SPLB interface 215, may have an integer dependency with respect to frequency of crossbar 299. Examples of such frequency dependency crossbar-to-PLB interface may be 1:1, 1:2, 1:3, etc. Crossbar 299 may operate at 1/N (integer) or 2/N ratio of with respect to frequency of microprocessor 200, for N a positive integer greater than zero. Therefore, frequency of operation of MPLB interface 213, as well as SPLB interfaces 214 and 215, may have a non-integer clock ratio with respect to frequency of operation of microprocessor 200.

Accordingly, it should be appreciated that FIFOs, such as FIFOs 250, 251, 260, and 261, as well as command queues (not shown for purposes of clarity) of crossbar 299, generally represent respective pipeline channels for bridging transactions, such as from microprocessor 200 to FPGA fabric 290. PLB reading from and writing to microprocessor 200 may be via respective unidirectional channels; however, unidirectional channels associated with PLBs of microprocessor 200 have been combined into bidirectional channels in MPLB interface 213. Thus, MPLB interface 213 is a bidirectional interface using FIFOs 260 and 261 and multiplexer circuitry (not shown for purposes of clarity). Thus, for example, an instruction fetch may be issued via IPLB 202 to memory controller interface 212 via crossbar 299 to read an instruction from memory coupled thereto via a memory controller instantiated in FPGA fabric 290, and at the same time microprocessor 200 may issue a data write via DWPLB 204 to MPLB interface 213 via crossbar 299 to write data to a peripheral device coupled thereto. This may be done concurrently through crossbar 299, as switch 211 has separate sets of connections, namely one set of connections for memory controller interface 212 and one set of connections for MPLB interface 213, such that transactions for memory controller interface 212 and MPLB 213 do not block one another. Moreover, each of these sets of connections is for a 128-bitwidth, and communication with and within crossbar 299 is configured for a line width of 128 bits.

Order of transactions is preserved via pipelines and buffers, including a command buffer (not shown for purposes of clarity) for multiple transactions targeted to memory controller interface 212 for example. Likewise, order of transactions is preserved via pipelines and buffers, including another command buffer (not shown for purposes of clarity) for multiple transactions targeted to MPLB interface 213 for example. The side of MPLB interface 213 associated with FPGA fabric 290 is not a FIFO based protocol, but rather is an address/data transaction protocol with a data phase and an address phase.

In addition to memory controller interface 212 which is configurable for a user-specified memory protocol, MPLB interface 213, which uses a PLB protocol with bidirectional read and write busing, there are additional blocks that increase the interface bandwidth of processor block 110. These additional blocks may include one or more of DMA interfaces 216 through 219 and include one or more of SPLB interfaces 214 and 215. Again, each of DMA interfaces 216 through 219 includes an inbound FIFO 230 and an outbound FIFO 231, and each of SPLB interfaces 214 and 215 includes an inbound FIFO 240 and an outbound FIFO 241.

In this exemplary embodiment, DMA interfaces 216 and 217 and SPLB interface 214 are grouped together for access to decoder 222 via arbiter 227. Likewise, DMA interfaces 218 and 219 and SPLB interface 215 are grouped together for access to decoder 222 via arbiter 228. It should be appreciated that DMA protocols and PLB protocols may be used for coupling to any of a variety of peripheral devices. In this exemplary embodiment, DMAs 216 through 219 are coupled to local links 220-1 through 220-4, respectively. Each local link is a parallel but unidirectional communication bus. In other words, in this exemplary embodiment there are four output local links and four input local links. Input local links may be associated with FIFOs 230 and output local links may be associated with FIFOs 231. Transmit local links are independent of their associated receive local links. Local links are well known, and thus not described in unnecessary detail herein.

In the exemplary embodiment, clock rate of SPLB interfaces 214 and 215 is user settable to an integer ratio with respect to the frequencies of operation of microprocessor 200 and crossbar 299. However, the data rate of communication via local links 220-1 through 220-4 is independent of the clock rate of microprocessor 200. Thus DMA interfaces 216 through 219 may be asynchronous with respect to crossbar 299; in other words no edge relationship need be present. The side of FIFOs 240, 241, 250, 251, 260, and 261 associated with FPGA fabric 290 generally has a synchronous relationship with respect to crossbar 299, and the side of FIFOs 230 and 231 associated with FPGA fabric 290 generally has an asynchronous relationship with respect to crossbar 299. For purposes of clarity by way of example and not limitation, it shall be assumed that the speed of operation of DMA interfaces 216 through 219 is approximately 200 to 250 MHz, and that the speed of operation of SPLB interfaces 214 and 215 is approximately 133.3 to 183.3 MHz.

In the exemplary embodiment of processor block 110, crossbar 299 is a five-to-two crossbar. In other words, there are five ports, respectively associated with decoders 222 through 226, for coupling to two blocks, respectively memory controller interface 212 and MPLB interface 213. Alternatively, a nine-to-two crossbar may be used or some other crossbar configuration; however, for reasons of anticipated utilization and relative clock rates, a five-to-two crossbar 299 is illustratively shown.

FIFOs of processor block 110, in addition to facilitating adaptation to differences in bandwidth, facilitate processing transactions concurrently by pipelining such transactions. As described below in additional detail, switch 211 is a non-blocking crossbar switch, and once access is granted to switch 211 execution happens immediately. Furthermore, because memory controller interface 212 is capable of operating at the rated frequency of microprocessor 200, having communication to processor block 110 via one or more of DMAs 216 through 219 or one or more of SPLB interfaces 214 and 215, or a combination thereof, is facilitated by having memory controller interface 212 performance enhanced in comparison with other interface blocks of processor block 110, namely SPLB interfaces 214 and 215 and DMA interfaces 216 through 219. Moreover, performance level of memory controller interface 212 is substantially greater than circuits instantiated in CLBs or other programmable logic of FPGA fabric 290.

A master device, for example instantiated in FPGA fabric 290 or another ASIC core of FPGA 100, may be coupled to processor block 110 via an SPLB interface of SPLB interfaces 214 or 215 or a DMA interface of DMA interfaces 216 through 219. Memory controller interface 212 may be thought of as having only one slave device coupled to it, namely memory coupled to it via a memory controller. Furthermore, such a memory controller for interfacing to memory may be substantially simplified as the PHY layer of such memory controller may be directly interfaced with memory controller interface 212. MPLB interface block 213 however is not limited to a single slave device, but may have multiple slave devices coupled to it. This is part of the reason for the slower frequency of operation of MPLB interface 213 in comparison to memory controller interface 212.

Other master devices, such as other ASIC cores, other processors whether instantiated in FPGA fabric 290 or as ASIC cores, or other circuits whether ASIC cores or instantiated in FPGA fabric 290, may be coupled to processor block 110 via any of DMAs 216 through 219 or SPLB interfaces 214 or 215. It is not necessary that all transactions proceed to memory via memory controller interface 212. Thus, a master device may be coupled for example to DMA interface 216 for executing a transaction utilizing a slave device, which may be a memory controller or a peripheral device, coupled to MPLB interface 213. Moreover, a master device coupled to SPLB interface 215 may issue a transaction a slave device coupled to MPLB interface 213. It should, however, be understood that excluding transactions initiated by microprocessor 200, transactions from master devices coupled to any of DMA interfaces 216 through 219 or any of SPLB interfaces 214 and 215 go into crossbar 299 and then to either memory controller interface 212 or MPBL interface 213 to a memory controller or to one or more other slave devices, respectively, coupled thereto. Moreover, transactions may go from FPGA fabric 290 to memory controller interface 212 or MPBL interface 213 and then to any of local links 220-1 through 220-4 via DMA interfaces 216 through 219, respectively. In short, transactions go into and out of crossbar 299 and interfaces 298 of processor block 110, and thus crossbar 299 and interfaces 298 in combination may be thought of as a bridge or bridges.

SPLB interfaces 214 and 215 in combination with MPLB interface 213 support address pipelining. Thus, if a transaction is stalled, other transactions may be stacked up behind it in an output command queue of crossbar 299. There are two output command queues of crossbar 299, namely one for reads and one for writes to allow concurrent read and write transactions as described below in additional detail. Commands waiting in output command queues have completed an address decode phase, and may be waiting on a data phase to begin. At the completion of a data phase for a current command being processed, a next command in a command queue has its data phase initiated, and successive data phases may be initiated without any "dead" cycle between them. It should be understood that outbound FIFOs 251 and 261 facilitate pipelining for adaptation to availability and relative transaction speed of slave devices coupled to memory controller interface 212 and MPLB interface 213, respectively.

There may be local buses inside FPGA 100 that are dedicated. For example, if a slave device is not shared, but rather is receptive to only one master device, then a dedicated local bus may be used. While processor block 110 may be used for such a bridging operation, a local bus may be used instead. However, slave devices may operate with 32, 64, or 128 bit transactions as MPLB interface 213 is not only adaptable to different bus sizes, but is also adaptable to different transactions sizes. Thus, for example, a 32 bit transaction may be performed via a 128-bit soft bus in FPGA fabric 290 coupled to MPLB interface 213. Again, processor block 110 internal busing crossbar 299 for example is 128 bits. So, for example, a burst of 8 64-bit transfers is a burst of 4 128-bit transfers in crossbar 299. Thus, 32- and 64-bit transactions from soft masters for example are converted to a 128-bit format for processing through crossbar 299. This conversion may include command modification, data mirroring, and steering. Additionally, the conversion may optionally include packing for burst transfers and line transfers to enhance bandwidth efficiency of crossbar 299, namely to enhance usage of the full width of 128-bit internal crossbar 299 buses. Single transfers thus may not be packed.

Transfers may be misaligned. A packet may not be aligned to a quad word. So to align transfers, a single word transaction for a larger transfer is performed first, followed by one or more quad word aligned transactions depending on the size of the transfer. These transactions may for example be 8 quad word aligned transactions. If the quad word aligned transactions are too large to end the transfer, a single word transaction or transactions may be used to complete the transfer.

Microprocessor 200 is a master device as it issues transactions for other devices. Furthermore, it should be appreciated that any transactions which originate via a master device coupled to any of DMA interfaces 216 through 219 or SPLB interfaces 214 and 215, or via microprocessor 200 exit processor block 110.

SPLB interfaces 214 and 215, like MPLB interface 213, are 128 bits wide and may be set to operate as 32- or 64-bit wide interfaces. In contrast, DMA interfaces 216 through 219 to FPGA fabric 290 are each 32 bits wide. Moreover, MPLB interface 213 and SPLB interfaces 214 and 215 are dynamic interfaces, as their bus width on a side associated with FPGA fabric 290 may be varied for coupling to a soft bus configured using PIPs of FPGA fabric 290; however, even though DMA interfaces 216 through 219 may be coupled to a soft bus configured using PIPs of FPGA fabric 290, their bus width is fixed at 32 bits.

FPGA fabric 290 operates much more slowly for example than crossbar 299. Thus, a five-to-two crossbar, rather than a nine-to-two crossbar, may be implemented, where all of DMA interfaces 216 through 219 are operating at full capacity without any apparent "dead cycle" or "bubble." Part of this implementation involves having interface blocks, such as DMA interfaces 216 through 219 and SPLB interfaces 214 and 215, accumulate a threshold amount of data before being granted access to switch 211. Local links 220-1 through 220-4 are dedicated interfaces, not soft buses, and there is no notion of address mapping for local links 220-1 through 220-4. There is flow control signaling for local links, such as ready/not ready signaling.

DMA interfaces 216 through 219 and SPLB interfaces 214 and 215 are "slave" interfaces. More particularly, DMA interfaces 216 through 219 are controlled via a DCR interface, described below in additional detail, for servicing microprocessor 200 or another master device coupled via such a DCR interface. SPLB interfaces 214 and 215 have coupled to them a master device, which is external to processor block 110, such as may be instantiated in FPGA fabric 290. However, memory controller interface 212 and MPLB interface 213 are "slave" interfaces with respect to microprocessor 200, DMA interfaces 216 through 219, and SPLB interfaces 214 and 215, as memory controller interface 212 and MPLB interface 213 each service microprocessor 200, and one or more master devices coupled via DMA interfaces 216 through 219 or SPLB interfaces 214 and 215. Memory controller interface 212 and MPLB interface 213 are master interfaces with respect to "slave" devices coupled thereto via buses external to processor block 110.

Arbiters 227 and 228 may be implemented as round robin arbiters. Thus, for example arbiter 227 may select any of DMA interface 216, DMA interface 217, or SPLB interface 214 in a round robin format. However, for SPLB interfaces 214 and 215 to have a right to request access to switch 211, SPLB interfaces 214 and 215 are to have stored therein a set threshold amount of data ready to be exchanged across switch 211. The threshold level of data may be set by a user. For DMA interfaces 216 through 219, this threshold level of data is not user settable, but rather is fixed by DMA protocol.

It should be appreciated that FIFOs 230, 231, 240, 241, 250, 251, 260, and 261 each have a bitwidth corresponding to the bitwidth of memory controller interface 212 and MPLB interface 213, namely 128 bits wide for example. Thus, the input and output FIFOs of DMA interfaces 216 through 219 may receive 32 bits at a time with byte enables on a 128 bit wide bus of associated FIFOs 230 and 231. In other words, a user may write, or read, multiple quad words onto, or from, a line of any of FIFOs 230, 231, 240, 241, 250, 251, 260, and 261. FIFOs 230, 231, 240, 241, 250, 251, 260, and 261 may be implemented with latches or flip-flops or a combination thereof. Again, the user may set the threshold amount of data for SPLB interfaces 214 and 215 to request access to switch 211. The minimum a user may set may be one quad word. However, once access is obtained, even if there is a partial quad word to process as part of such data meeting or exceeding a threshold amount, such partial quad word is processed along with the data for which access is granted.

Inbound FIFOs 230, 240, 250, and 260 allow data to be accumulated. Once enough data is accumulated without overflowing any of FIFOs, 230, 240, 250, and 260, arbiters 227, 228 allow requests to be sent. The threshold amount of data to be accumulated by SPLBs 214 and 215 may be individually set by register settings. Thus each of SPLBs 214 and 215 may have same, different, or a combination of one or more threshold setting. Such threshold settings include 1, 4, 8, or 16 quad words. Each cache word may be two quad words wide. To reduce request overhead to access switch 211, arbiters 227 and 228 preclude requests until a threshold amount of data has been accumulated in an inbound FIFO. Thus, this is a load balancing-multiplexing protocol. Data flow out of outbound FIFOs 231, 241, 251, and 261 may be dependent upon master devices external to processor block 110, such as may be instantiated in FPGA fabric 290.

As described below in additional detail, register address mapping is configurable for processor block 110, namely for accessing either memory controller interface 212 or MPLB interface 213. Addresses are input to decoders 222 through 226. More particularly, after arbitration via arbiter 227 or 228, an address associated with a transaction to be provided to either memory controller interface 212 or MPLB interface 213 is decoded by decoder 222 or 226, respectively. It should be appreciated that address decoding may be performed before arbitration by arbiter 221, namely address decoding is performed by decoders 222 through 226 before crossbar arbitration by arbiter 221. Additionally, as part of the decoding to select between memory controller interface 212 or MPLB interface 213, there may be additional decoding of an address within the selected interface, namely an address for a slave device coupled to memory controller interface 212 or MPLB interface 213. A decoded address may be provided to arbiter 221 for providing access to switch 211. Arbiter 221 may be configured by user selection for any of a variety of arbitration protocols responsive to register input. Examples of such arbitration protocols include round robin, fixed, and least recently used; however, other arbitration protocols may be used. Arbitration by arbiter 221 and decoding by decoders 222 through 226 may be performed with some degree of parallelism to facilitate a one clock cycle latency as previously described.

Crossbar 299 provides a non-blocking interconnection. By non-blocking it means that two different master devices may access two different slave devices simultaneously. For example, a master device in FPGA fabric via one of DMA interfaces 216 through 219 may access memory controller interface 212 simultaneously while microprocessor 200 accesses MPLB interface 213. However, multiple master devices may have multiple transactions that are pipelined to a single interface, such as either or both of interfaces 212 and 213.

Memory mapping may be done with a configuration bitstream to set register values. These register values may be set in internal registers 270. Alternatively, rather than or in addition to setting register values using a configuration bitstream, DCR operations may be used to set register values. However, memory mapping for some user designs may not change, and thus setting register values by configuration bitstream may be sufficient in some applications. Each of memory controller interface 212 and MPLB interface 213 may thus be address programmable.

Moreover, this memory mapping is flexible. It should be understood that because address spaces for a user design to be instantiated into FPGA fabric 290 may vary from user to user, such address spaces are not fixed. Rather, a user may program the memory map for processor block 110 via a configuration bitstream, or alternatively via DCR 205. However, programmed memory address spaces may be changed via DCR 205 after programming via a configuration bitstream. An example of memory mapping may include setting an address in a memory map of memory controller interface 212 for booting microprocessor 200 from flash memory located at such address and coupled to memory controller interface 212. Another example of memory mapping may be setting a portion of the memory address range that may be mapped to MPLB interface 213 for accessing peripherals.

Supported transfer types may include single word, cache line, fixed length burst, and indeterminate burst (e.g., end location of bursting transfer not presently known). It should be appreciated that there is a distinction between burst and line data transfers. Line transfers have an architectural identity in that they start at the beginning of a line and go to the end of the line. Thus, for a cache line transfer, access starts from the beginning of the line and goes to the end of the line, whether or not a wraparound condition follows. In contrast burst transfers may start at the beginning of any word on a line at an identified address and continue until an end word is reached. Thus, a burst transfer may, but need not, start at the beginning of a line. Because of the architectural identity of line transfers, line transfers are not translated. However, burst transfers may be translated. Thus, for example long bursts may be translated to fixed short-length bursts by multiplexing circuitry (not shown) of crossbar 299.

Default values for configuration of internal registers 270 of processor block 110 may be programmed into configuration memory cells 291 coupled to internal registers 270. Such default values may be programmed into memory cells 291 via a configuration bitstream. Thus, immediately upon a reset of processor block 110, default values may be loaded from memory cells 291 into configuration registers 270.

Each local link 220-1 through 220-4 has a separate receive and separate transmit bus each of which is 32 bits wide and each of which is independent from one another. Quad words may be aligned as previously described for providing 128 bits to inbound FIFOs 230. A local link, such as of local links 220-1 through 220-4, is either all on or all off, and thus a scatter or gather approach is employed.

Figure 3:
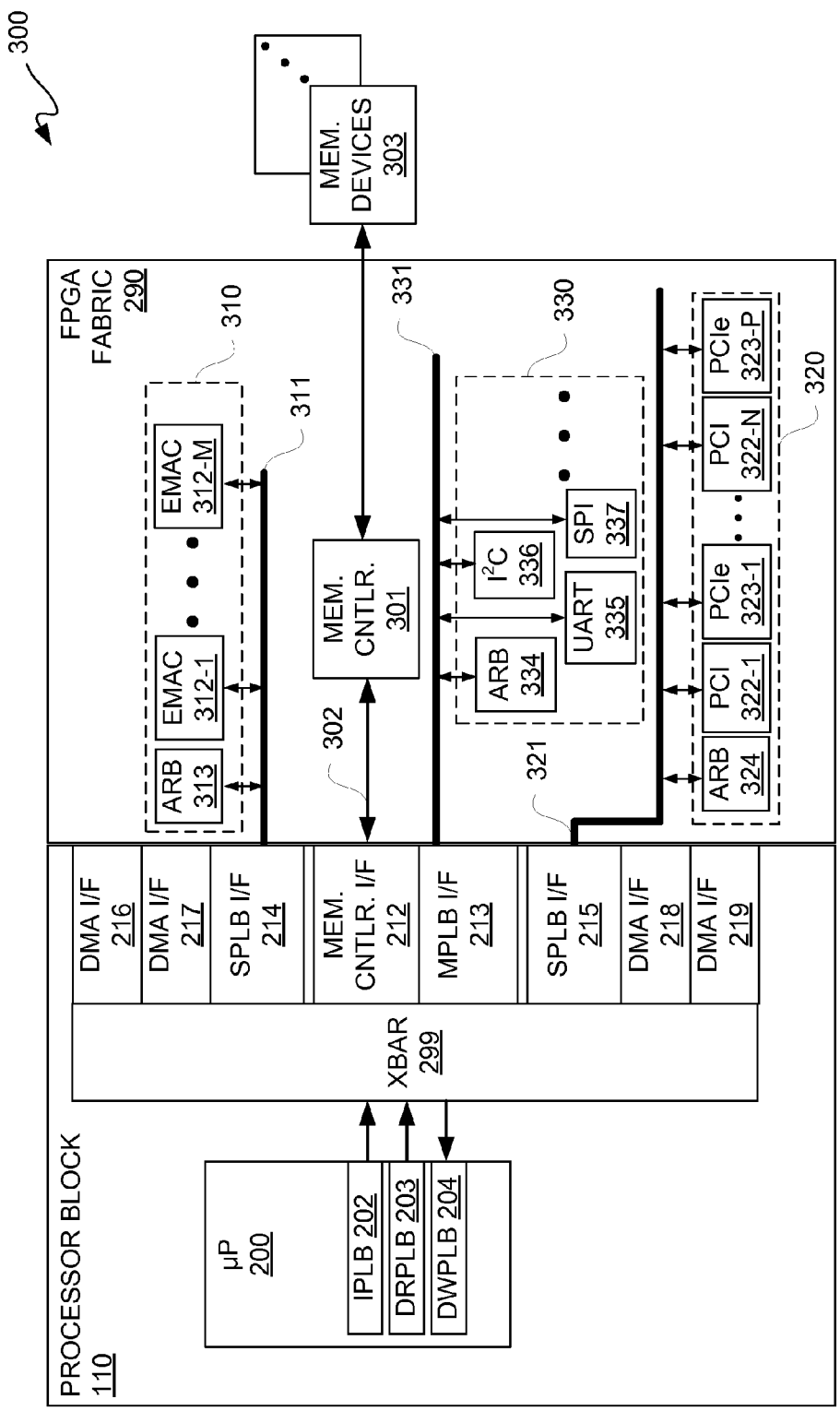
FIG. 3 is a block diagram depicting an exemplary embodiment of a system in which the processor block of FIG. 2 may be used.

FIG. 3 is a block diagram depicting an exemplary embodiment of a system 300 in which processor block 110 may be used. Processor block 110 may be coupled to a memory controller 301 instantiated in FPGA fabric 290. Accordingly, memory controller 301, or at least the portion of that circuit instantiated in programmable logic of FPGA fabric 290, may be thought of as a "soft" memory controller. Memory controller 301 may be coupled to memory controller interface 212 of processor block 110 via soft memory control interface bus 302. Buses 311, 321, and 331 may all be soft buses instantiated using PIPs of FPGA fabric 290. Memory controller 301 may be coupled to one or more memory devices 303, where such one or more memory devices 303 are either internal or external to FPGA 100.

As previously described, master devices may be instantiated in FPGA fabric 290. For example, one or more soft master devices 310 may be coupled to a soft SPLB 311 which is coupled to SPLB interface 214 of processor block 110. Soft SPLB 311 may have coupled to it one or more Ethernet media access controllers ("EMACs") 312-1 through 312-M, for M a positive integer greater than zero. There may be arbitration associated with access to SPLB 311 as indicated by arbitration block 313. EMACs 312-1 through 312-M are master devices, which in this exemplary embodiment are implemented in FPGA fabric 290 as soft master devices. However, it should be understood that one or more hard EMAC master devices may be coupled to SPLB interface 214 via SPLB 311.

Moreover, one or more other soft, or hard, master devices 320 may be coupled to soft SPLB 321 which is coupled to SPLB interface 215. In this example, soft master devices of FPGA fabric 290 are PCI blocks 322-1 through 322-N, and PCI Express blocks 323-1 through 323-P, for N and P positive integers greater than zero. PCI blocks 322-1 through 322-N, and PCI Express blocks 323-1 through 323-P may be coupled to SPLB interface 215 via soft SPLB bus 321. An arbitration block as generally indicated by arbitration block 324 may be used to arbitrate access of PCI blocks 322-1 through 322-N and PCI Express blocks 323-1 through 323-P to SPLB 321.

As previously indicated, MPLB interface 213 is a slave device with respect to switch 211. However, MPLB interface 213 is master device with respect to slave devices coupled to soft MPLB 331. More particularly, one or more hard or soft slave devices may be coupled to soft MPLB 331. In this exemplary embodiment, soft slave devices 330 which are coupled to MPLB 331 are instantiated in FPGA fabric 290. Access to MPLB 331 may be arbitrated by an arbitration block 334. Examples of soft slave devices may include one or more instances of a UART 335, an I²C block 336, an SPI block 337, or one or more other peripheral devices.

In the exemplary embodiment previously described, crossbar 299 provides command pipelining in command FIFOs for up to five transactions to each of memory controller interface 212 and MPLB interface 213 corresponding to the five master transaction inputs to decoders 222 through 226 of FIG. 2. However, as previously indicated other command queue depths may be used.

Though not illustratively shown for purposes of clarity, hard or soft master devices configured for DMA access may be coupled to DMA interfaces 216 through 219 dedicated local links 220-1 through 220-4, respectively. However, soft buses conforming to DMA protocol may be used rather than dedicated buses. Thus, for example, a hard or soft master device may be coupled to an a local link which is coupled to a DMA interface of DMA interfaces 216 through 219 of processor block 110 An example of such a DMA soft or hard master device includes an EMAC, a PCI or PCIe device, among other DMA capable devices.

Command conversion and command translation are two different operations. Command conversion in SPLB interfaces 214 and 215 generally refers to adapting a bitwidth of a master device to a native bitwidth of crossbar 299. Command conversion in MPLB interface 213 refers to adapting a native bitwidth of crossbar 299 to a non-native bitwidth of a slave device. Continuing the above example, assuming 128 bit native bitwidth for crossbar 299, master and slave devices instantiated in FPGA fabric 290 for example may have bitwidths for one or more of command and data buses which are less than 128 bits wide or are equal to 128 bits wide. Adaptation of non-128 bit fabric master and slave devices to 128 bit gasket logic provided for example by crossbar 299, SPLB interface 214 and MPLB interface 213, may be done by command conversion blocks respectively located in SPLB interface 214 and MPLB interface 213. Thus, as used herein, a command or data conversion covers a general case of adapting transactions between master and slave devices having mismatched bitwidths. For purposes of clarity by way of example and not limitation, the remainder of the description of command conversion and command translation is directed to SPLB interface 214 and MPLB interface 213, as it shall be appreciated that description of SPLB interface 215 follows from the description of SPLB interface 214.

Figure 4:
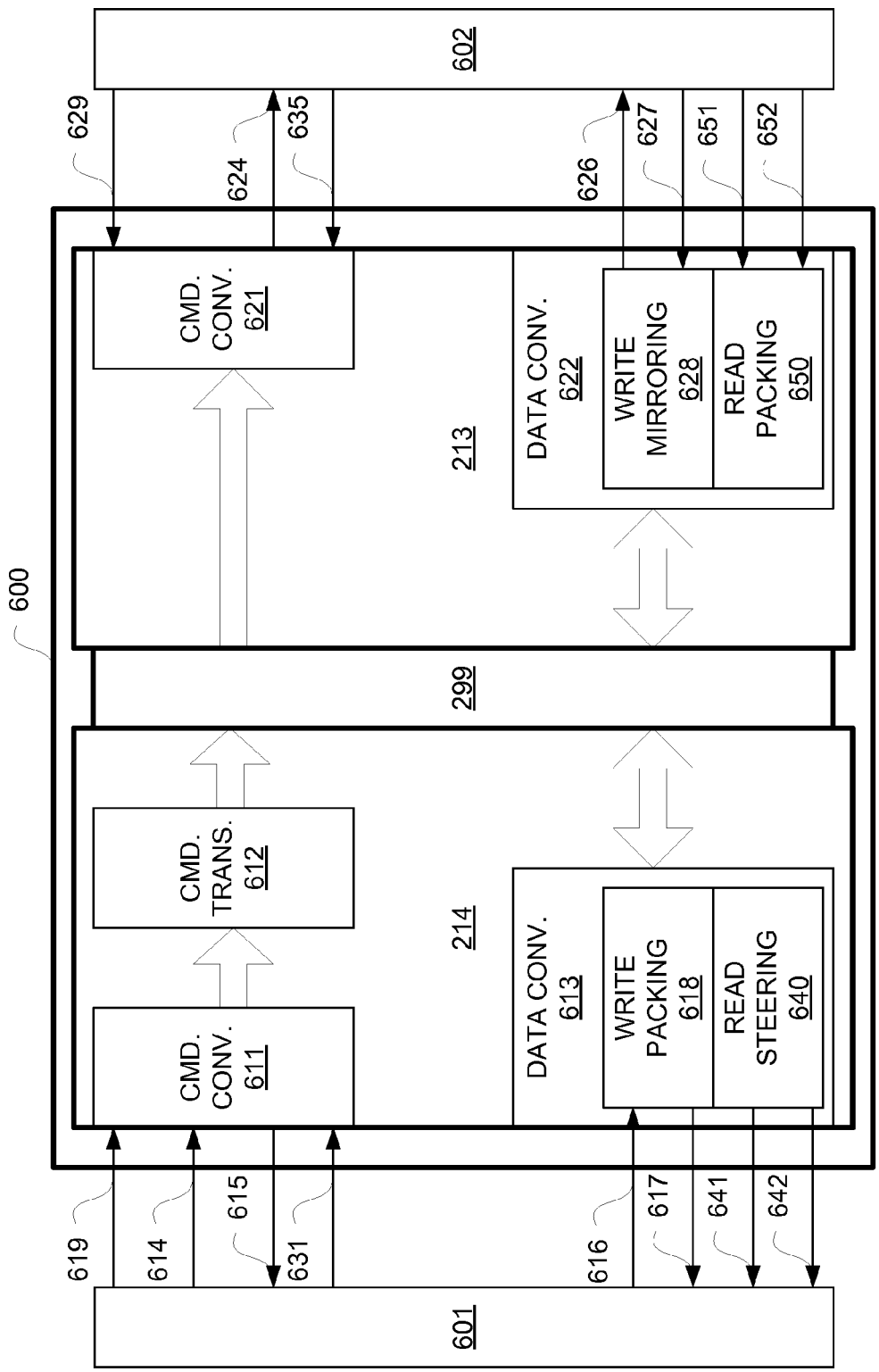
FIG. 4 is a block diagram depicting an exemplary embodiment of what is generally referred to as gasket logic for coupling one or more master devices via an arbiter instantiated in FPGA fabric to one or more slave devices via another arbiter instantiated in FPGA fabric.

FIG. 4 is a block diagram depicting an exemplary embodiment of what is generally referred to as gasket logic 600 for coupling one or more master devices via an arbiter instantiated in FPGA fabric 290 ("soft arbiter 601") to one or more slave devices via another arbiter instantiated in FPGA fabric 290 ("soft arbiter 602"). Soft arbiters 601 and 602 may respectively be instantiated in FPGA fabric 290, and thus for example may be arbiters 324 and 334, respectively of FIG. 3. Master and slave devices of various bitwidths, as described herein, may be coupled to gasket logic via arbiters 601 and 602, respectively.

For purposes of clarity by way of example and not limitation, the above mentioned example bitwidths are used; however, it should be appreciated that other bitwidths may be used in accordance with the following description. Furthermore, continuing the above example, a PLB protocol is described; however, it should be appreciated that other processor protocols may be used. Master arbiter 601 may be configured for 32 bit, 64 bit, and 128 bit PLB arbitration of master devices having any of those bitwidths. Likewise, slave arbiter 602 may be configured for 32 bit, 64 bit, and 128 bit to accommodate any of those bitwidths of PLB slave devices.

Depending on sizes of command bus bitwidths of master and slave devices, command conversion may occur in either or both SPLB interface 214 and MPLB interface 213. Command conversion involves additional wiring and logic at the boundary of gasket logic 600 to FPGA fabric 290 for data mirroring and steering. Furthermore, command conversion may involve conversion of one transaction to another transaction type, the generation of one or more new PLB transactions, or the modification of a PLB transaction. In PLB terminology, a conversion cycle may be used to describe additional transfer cycles for single transactions between a master device having a wider bitwidth than an associated slave device. However, as used herein, a conversion or conversion cycle is used to cover a more general case of adapting transactions between master and slave devices having mismatched bitwidths.

SPLB interface 214 includes command conversion block 611, command translation block 612, and data conversion block 613. MPLB interface 213 includes command conversion block 621, and data conversion block 622. Command conversion block 611 dynamically carries out 32 bit to 128 bit conversion and 64 bit to 128 bit conversion for example when a master device instantiated in FPGA fabric 290 and coupled to soft arbiter 601 has a bitwidth of 32 or 64 bits, respectively. If such a master device has a 128 bit bitwidth, such bitwidth is unchanged by command conversion block 611.

A converted command is provided from command conversion block 611 to command translation block 612. Command translation block 612 is for burst transactions only. However, it should be appreciated that a burst transaction may include one or more operations other than burst operations, as described below in additional detail. Thus for example, a read/write command signal is used to provide a read or write command ("read/write command 614") to SPLB interface 214 from soft arbiter 601. In response, SPLB interface 214 provides an address acknowledgment signal ("address acknowledgement 615") back to soft arbiter 601. For a write command 614, soft arbiter 601 provides a write data signal ("write data 616") to data conversion block 613 of SPLB interface 214. In response, SPLB interface 214 provides a write data acknowledgment signal of a write data acknowledgement/complete signal ("write data ack/write comp 617") back to soft arbiter 601. If the write data is provided as less than 128 bits, a write packing sub-block 618 of data conversion block 613 is used. Such write packing is for converting 32-bit or 64-bit write data to a 128-bit bitwidth. Thus for example, if the write data was only a total of 96 bits, write packing sub-block 618 is used to pack such write data to provide a cache line of 128 bits, such as packing with 0's for example.

Command translation preformed by command translation block 612 refers to operations of breaking up within SPLB interface 214 PLB write bursts and read bursts from a PLB master device into shorter bursts, and in some instances single transfers may be included. This is done partly as a store-and-forward strategy and partly to limit the amount of data transfer latency experienced by other PLB devices sharing gasket logic 600. If a transaction is a non-burst transfer, such command for such transaction is not translated by command translation block 612. Additionally, no command translation is preformed on a burst transaction that is sufficiently short, as described below in additional detail.

When a 128 bit wide soft master device sends or receives long bursts of data to and from a 128 bit soft slave device, such as may be respectively coupled to one another via soft arbiters 601 and 602 and gasket logic 600, no command conversion is performed; however, command translation by command translation block 612 may be performed. However, if either the master or slave device is not 128 bit wide device, command conversion may be performed. If either or both a soft master device and a soft slave device are not 128 bits wide, then either or both command conversion block 611 and 621, respectively, may be used. Furthermore, if a burst is sufficiently short or a non-burst transaction is involved, then command translation 612 may not be used regardless of the command bitwidth size of soft master and slave devices.

Gasket logic 600 in this exemplary embodiment is PLB bridging device that may be connected to FPGA fabric 290 in a variety of manners including the exemplary embodiment of FIG. 4. Gasket logic 600 for this exemplary embodiment is 128 bit device that works natively with 128 bit PLB master and slave devices. Additionally, gasket logic 600 works with both 32 and 64 bit fabric PLB master and slave devices. Thus, both interfaces 213 and 214 carry out conversion operations for converting 32 and 64 bit PLB transactions into 128 bit transactions, and vice-versa. SPLB interface 214 adapts non-128 PLB master devices to gasket logic 600, and MPLB interface 213 adapts gasket logic 600 to non-128 bit slave devices. SPLB interface 214 determines the size or bitwidth of a master device through a master size signal 619 from a master device. MPLB interface determines a slave bitwidth size through a slave size signal 629 from a slave device. Gasket logic 600 supports dynamic bus sizing so that master and slave devices of different sizes may coexist and be coupled via gasket logic 600.

Command conversion block 611 for converting 32 and 64 bit PLB commands into 128 bit commands may be used for single line and burst transfers. No command conversion is necessary for single transfers, where both data words and byte enable signals are assumed to be already properly mirrored just outside of gasket logic 600 in accordance with PLB specifications; a byte enable signal may be updated to reflect the location of a word or double word as indicated by an address bus address signal 631. Line transfer commands are invariant to bus size of a device and are word aligned accordingly to transfer length. For this example, it shall be assumed that transfer length may be either four, eight, or sixteen words long. Furthermore, for this example, words shall be assumed to be 32 bits, and thus a quad word shall be assumed to be 128 bits. Accordingly, it should be appreciated that no command conversion is performed on line transfers; however, data conversion is still used for data bus width adaptation for line transfers.

Single and line transfer commands are not converted by command conversion block 611. However, command conversion block 611 is used for burst transfers from 32 and 64 bit master devices for quad word alignment for 128 bit bursts. Depending on the starting word address and length of a burst transfer, a burst command may be translated into a single transfer command, a burst transfer command, or multiple commands that contain either or both single and burst transfers. A non-128 bit burst may be translated to any one of seven 128 bit transfer sequences, namely a single; a single followed by a single; a single followed by a single followed by another single; a single followed by a burst; a single followed by a burst followed by a single; a burst followed by a single; and a burst. From a PLB architecture perspective, it is possible for a 128 bit native device to work with 32 bits and 64 bits directly without command conversion. However, by converting commands for bursts, efficiency of crossbar 299 may be enhanced by reducing the number of clock cycles employed to transfer 32 or 64 bits through crossbar 299. In other words, bitwidth utilization of crossbar 299 is enhanced by command conversion.

For purposes of clarity by way of example, a 32 bit burst transfer example is used; however, it shall be appreciated from the following description that other types of bursts may be used. For this example, a 32 bit burst of eight write transfer is used, namely eight beats of 32 bits each are to be performed as the burst write. There may be some minimum as well as maximum number of beats allowed for a burst transfer. For example, 64 and 128 soft master devices may have burst transfers of 2 to 256 beats. By beats, it should be understood that generally this is the number of data transfer cycles involved for such a transfer. For a soft master device with a 32 bit bitwidth, 2 to 16 beats may be used for a burst transfer. It should be understood that a single beat burst transfer is performed as a single. Furthermore, a bounded or fixed-length burst transfer is one in which the number of beats are specified, namely the length of the transfer is specified. However, it should be appreciated that variable length or indeterminate bursts may be used in which the length of the transfer is not specified at the outset, but rather an indication of termination of the burst transfer is provided later.

Figure 5:
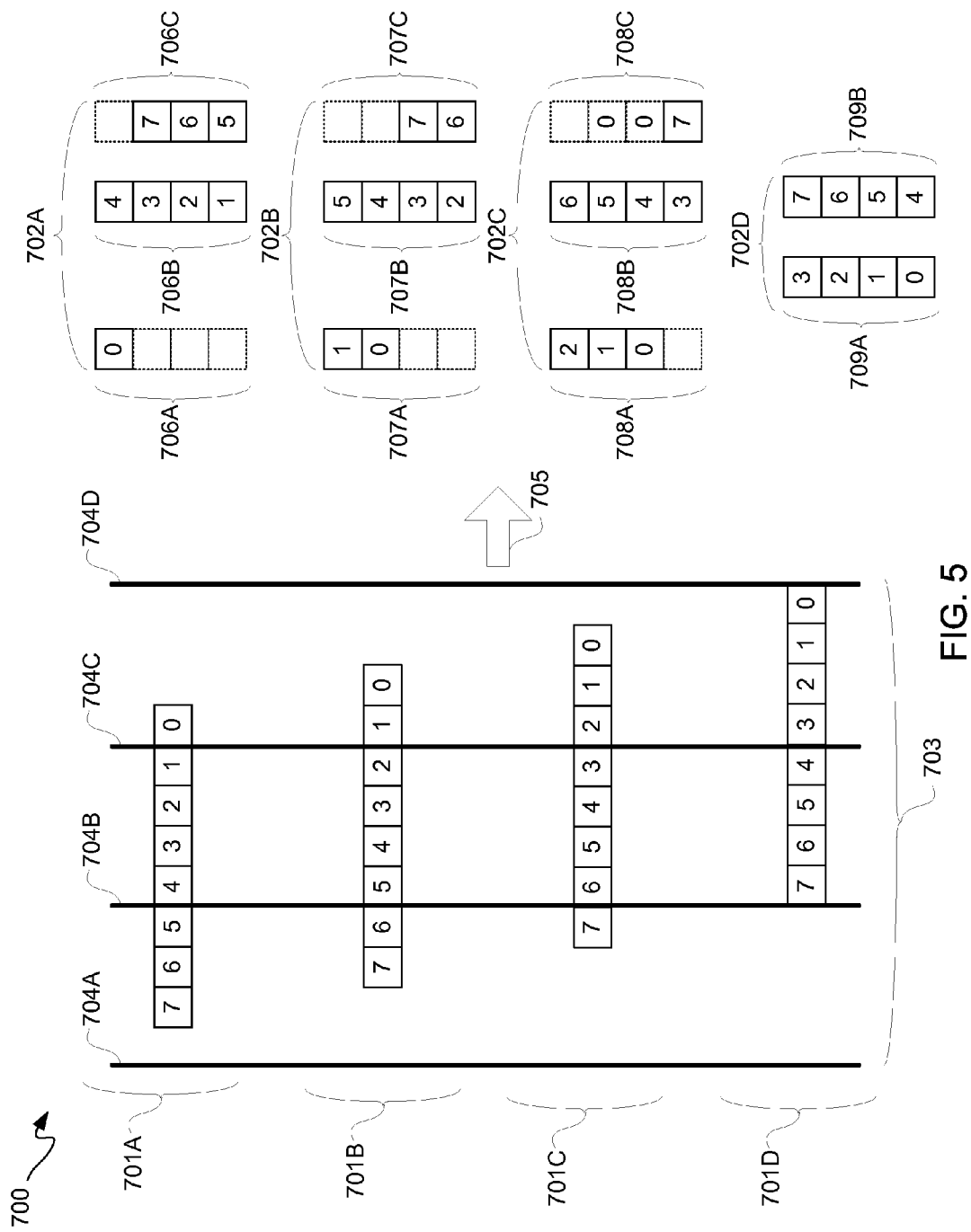
FIG. 5 is an information flow diagram depicting an exemplary embodiment of a combined command conversion and translation.

Returning to the example of a 32 bit burst of eight transfer, FIG. 5 is an information flow diagram depicting an exemplary embodiment of combined command conversion and translation 700. For command conversion and translation 700, there are four possible word address alignments 701A through 701D and after conversion they have four possible corresponding 128 bit transactions 702A through 702D. The eight words for this example are illustratively shown as eight blocks numbered 0 through 7.

For word address alignments 703, there are illustratively shown quad word boundaries 704A, 704B, 704C, and 704D. For a 32 bit burst of eight where quad word boundary 704B falls between 32 bit words 4 and 5 for word address alignment 701A, and quad words 1 and 0 thus have quad word boundary 704C therebetween, after 32 to 128 bit command conversion 705 here may be three single transfers 706A, 706B, and 706C for transaction 702A. For transfer 706A, quad word 0 is transferred, for transfer 706B quad words 1 through 4 are transferred, and for transfer 706C quad words 5 through 7 are transferred. Thus, the single write or read command associated with word address alignment 701A may be broken up, namely into three single transfers 702A. This breaking up may be done by command conversion block 611.

It should be appreciated that FIG. 5 applies to both reads and writes. For a write, the square boxes representing words 0 to 7 are packed by data conversion block 613 using write packing sub-block 618. For a read, the square boxes representing words 0 to 7 may correspond to "holds" for read data words 0 to 7, and such data words, when they come back during a data phase after a read may be steered by read steering sub-block 640 of data conversion block 613. Read steering sub-block 640 may be thought of as a multiplexer where 128 bits are provided to a data input side and these bits are selectively output in 32 or 64 bit chunks depending on whether the master device is a 32 or 64 bit wide master device. Of course, for 128 bit wide soft master device, no read steering need be used. Read data may be provided after having been read from for example a soft slave device to MPLB interface 213 via soft arbiter 602, and then to SPLB interface 214 via crossbar 299. Such read data may be provided to soft arbiter 601 via a read data signal ("read data 641"). Additionally, a read data acknowledgment signal and a read data complete signal ("read data ack/comp 642") are provided from SPLB interface 214 to soft arbiter 601 to acknowledge a read and a completion thereof.

Similarly, data conversion block 622 has a write mirroring sub-block 628 for taking 128 bit inputs, such as to a multiplexer, for providing 32 or 64 bit chunks of data at a time for a soft slave device associated with either a 32 or 64 bit wide data interface, respectively. For 128 bit wide data interface for a soft slave device, no write mirroring need be employed in this example. A write data signal ("write data 626") is used to provide write data 626 to soft arbiter 602 for a targeted soft slave device. A write data acknowledgment signal ("write data ack 627") is provided back from such soft slave device via soft arbiter 602 to acknowledge a write.

For read data provided via a read data signal ("read data 651") from soft arbiter 602 to MPLB interface 213 after having been read from a slave device, such read data is provided to read packing sub-block 650 of data conversion block 622. Additionally, a read data acknowledgment signal ("read data ack 652") is provided from such slave device via soft arbiter 602 to MPLB interface 213. For a soft slave device having a 32 or 64 bit data bus, read packing sub-block 650 converts such 32 to 64 bit chunks of data to 128 bit data, using zero packing, for crossbar 299.

Command conversion block 621 is used to convert 128 bit native bus commands to 32 or 64 bit command bus read and write commands via read/write command signal 624 for soft arbiter 602 to pass along to a slave device. Such slave device provides an address acknowledgment signal 625 via soft arbiter 602 back to MPLB interface 213. If such slave device has a 128 bitwidth, command conversion block 621 does not convert such command. It should be appreciated that after command conversion block 611 has converted a command for example into multiple commands, command conversion block 621 via read/write command signal 624 provides multiple commands to a slave device.

Returning to FIG. 5, for word address alignment 701B, where the initial address causes quad words 5 and 6 to have a quad word boundary 704B between them and words 1 and 2 to have a quad word boundary 704C between them, after a 32 to 128 bit command conversion 705 by command conversion block 611, three single transfers 702B may be provided from command conversion block 611, responsive to the read or write command. In this example, a first single transfer 707A transfers words 0 and 1; the next single transfer 707B transfers words 2 through 5; and the last single transfer 707C transfers words 6 and 7. Dashed boxes in transfers, such as illustratively shown in transfers 702A through 702C, indicate bit packing potential for transfer across crossbar 299.

For word address alignment 701C, a starting address has words 6 and 7 bordering quad word boundary 704B and quad words 2 and 3 bordering quad word boundary 704C. After conversion 705, three single transfers 702C result from command conversion block 611. In this example, words 0 through 2 are transferred with single transfer 708A, words 3 through 6 are transferred with single transfer 708B, and word 7 is transferred with single transfer 708C.

If both starting and ending addresses align with quad word boundaries, no single transfers result. In the example of word address alignment 701D, words 0 through 3 are between quad word boundaries 704D and 704C, and words 4 through 7 lie between quad word boundaries 704C and 704B. After conversion 705, a burst of two transfer 702D results after command translation by command conversion block 611. Burst of two quad-word transfer 702D consists of words 0 through 7, namely quad words 709A and 709B.

It should be understood that data conversion and command conversion may not be the same. Data conversion block 613 of SPLB interface 214 adapts 32 and 64 bit master data bus widths to 128 bit data bus width of gasket logic 600. Such data conversion is applicable to both line transfer and burst transfer which may be subject to translation by command translation block 612. Single transfers that originate from soft masters are not converted by data conversion block 613. For data conversion, write data words and double words are packed into quad words as applicable and quad words for reads are steered into proper word lanes for 32 and 64 bit soft master devices.

Command conversion block 621 functions as a command conversion master for soft slave devices. Transactions originating from MPLB interface 213 for a soft slave device are 128 bits wide. This bitwidth is equal to or larger than the bitwidths of fabric slave devices. As a result, transactions are automatically word aligned, which significantly simplifies conversion. A single quad word transfer may be converted into one to four single transfers for a 32 bit soft slave device or one to two single transfers for a 64 bit slave device. The number of converted single transfers depends on the number of valid words in a single quad word, which is indicated by a byte enable signal. For example, if all four words in a quad word are valid, there may be four single transfers for 32 bit slave device, or two single transfers for a 64 bit slave device. Another example is if there are three words which are valid, then there may be three single 32 bit transfers or two single 64 bit transfers. With respect to the latter, one of the two single 64 bit transfers has only one valid word.

For line transfers and burst transfers without slave device early termination, no command conversion is preformed by command conversion block 621, and data conversion block 622 is used if bus width adaptation is to be employed. As previously indicated, write quad words are mirrored into proper word lanes for 32 and 64 bit slave devices. Additionally, for data conversion block 622 read data words and double words from 32 bit and 64 bit slave devices, respectively, may be packed into quad words as applicable for crossbar 299.

It should be appreciated that different types of soft master and slave devices may be respectively coupled to arbiters 601 and 602. Thus for example 32, 64, and 128 bit PLB master devices may be coupled to soft arbiter 601 at the same time. If any of these bitwidths, whether command or data or both bitwidths may be coupled to SPLB interface 214. Likewise, 32, 64, and 128 bit PLB slave devices may be coupled via soft arbiter 602 to MPLB interface 213. Thus, there are multiple combinations of command and data bitwidths that may be used with gasket logic 600 for communicating with master and slave devices.

As previously indicated, command translation involves breaking up of a long burst into a number of shorter burst transfers, which may include single transfers. Command translation may occur right after command conversion as previously described. Command translation for write bursts and read bursts are different due to an asymmetrical nature of such operations. In a write operation, command and data from a master device are generally available simultaneously. In contrast, in a read operation there is a delay between a sending of a read command by a master device and the read data being received by such master device from a slave device responsive to the read command.

An internal register such as of internal registers 270 may be set by a user to set a data size threshold for having an ability to request access to crossbar 299. This register setting associated with or in SPLB interface 214 determines the length of a write fixed length burst. Command translation block 612 may be configured to segment any write burst having a length larger than this threshold value into fixed length bursts of lengths equal to the threshold value. A last translation operation for such a long burst length may produce a residue burst length that has less than the threshold value. If the residue burst length is larger than one, a write burst may be sent as is. If the residue burst length is equal to one, it may be turned into a single transfer as there is no burst of one transaction defined by the PLB architecture specification. As a result, the length of write bursts produced by command translation block 612 may be either equal to or less than the threshold value.

Once the number of write burst data transfers in SPLB interface 214, and more particularly a write data FIFO of SPLB interface 214, has reached a threshold value, SPLB interface 214 generates a write burst request to crossbar 299. In other words, a write burst request may only be issued when the write data FIFO of SPLB interface 214 has accumulated a sufficient amount of data. Furthermore, once such as request has been acknowledged by crossbar 299 and an associated data transfer has started, the transfer rate across crossbar 299 is typically greater than the maximum data consumption rate of either interface 212 or 213. The data consumption rate of interfaces 212 and 213 may be equal to the memory interface or fabric interface clock rate, respectively. Thus it should be appreciated that the data FIFOs of interfaces 212 and 213 may not be empty and thus there may be no need to have a threshold register in either or both of interfaces 212 and 213.

It should be understood that the bitwidth of a threshold register may cover an entire range of possible lengths for fixed length bursting; however, supporting such variability may lead to additional circuitry, additional latency, poor efficiency, among other reasons not to provide such variability. Thus, even though variability of a threshold amount may be provided, it shall be assumed that the threshold amount is limited to discrete values. For purposes of clarity by way of example and not limitation, these discrete values are 16, 8, 4, 2, and 1 128 bit transfers. Therefore, a three bit threshold selection register may be sufficient to specify any of these above threshold selections.

After a user sets such a threshold, such a threshold is static. Thus, if a user sets the threshold at two, namely two 128 bit lines, then for each burst, 128 bits worth of data are sent at a time with two beats used to transfer such data across crossbar 299 for example. Additionally, to enhance flexibility, two three bit threshold selection registers, namely one for memory controller interface 212 and one for MPLB interface 213 may be used. Thus, the thresholds for access to crossbar 299 may be different depending on which interface, namely of interfaces 212 and 213, is to be accessed for the transaction. Additionally, these three bit threshold selection registers may be duplicated, namely two for each of interfaces 212 and 213 in order to have a write threshold be independent of a read threshold. It should be appreciated that the thresholds for access to crossbar 299 for writes and reads may be independent or dependent depending on the number of selection registers employed therefor.

For the threshold set to one, all burst transfers are translated into single transfer. For instance a burst of four transfers would be translated into four single transfers. However, while being useful for diagnostic reasons, this configuration would significantly reduce through put of gasket logic 600.

Address alignment is defined by threshold values. In other words, the threshold values set also define the translation address boundaries. A threshold of 16 also means a 256 byte address alignment that is, except for the first or last burst or both which ends or starts at a 256 byte address boundary, all other bursts start and finish at a 256 byte address boundary. Similarly, a threshold of 8 will result in 128 byte address alignment. A threshold of 4 has a 64 byte address alignment. A threshold of 2 has a 32 byte address alignment, and a threshold of 1 has a 16 byte address alignment.

Figure 6:
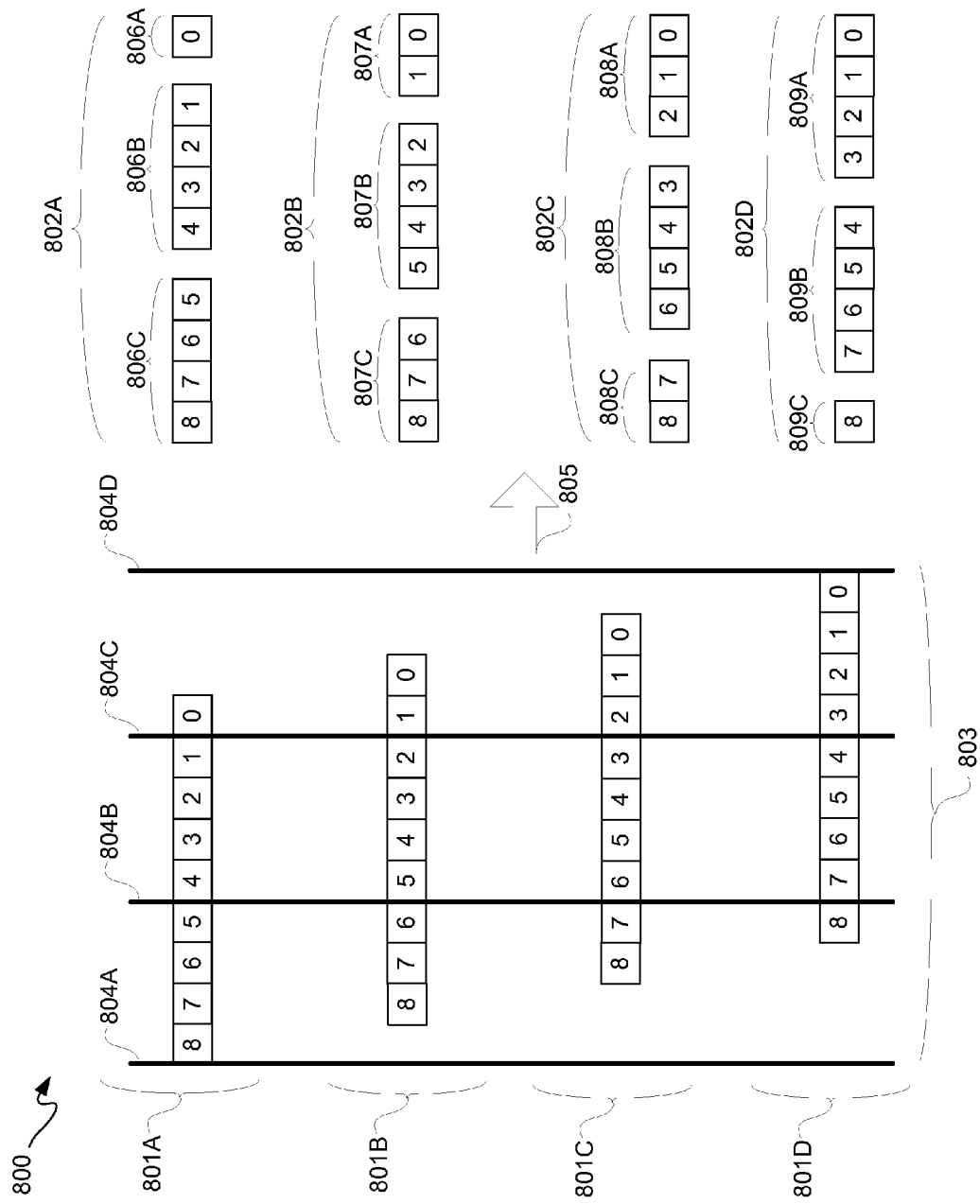
FIG. 6 is an information flow diagram depicting an exemplary embodiment of a command translation.

FIG. 6 is an information flow diagram depicting an exemplary embodiment of a command translation 800. In this example, a burst of 9 with a threshold of 4 is used for four possible quad word positions 803. The 9 quad words for each example burst as delineated by different starting addresses are generally indicated by a contiguous sequence of boxes labeled 0 through 8. Other bursts, thresholds, or quad word positions may be used in accordance with the following description. In FIG. 6 there are illustratively shown four possible command translations 802A through 802D corresponding to the four possible write burst commands 801A through 801D. Each of these possible command translations that may be preformed by command translation block 612 as described below in additional detail.

After command translation 805 such as by command translation block 612, for a burst of 9 with a threshold setting of 4 for the four examples of burst commands 801A through 801D to be translated, there are sequences of commands for command translations 802A through 802D.

For write burst command 801A, bits of an address bus, such as the six MSBs of a 32 bit address bus for example, may be used to identify boundaries 804A, 804B, 804C, and 804D where burst addresses follow from the threshold value settings. Again, for a threshold value of four, these addresses will be located with spacing four quad words between them. In this example, boundaries 804A, 804B, 804C, and 804D are indicated for a threshold value equal to four.

For the address associated with command 801A, the starting address means that quad word 0 is between boundaries 804C and 804D and rests along boundary 804C. After command translation for the command associated with transfer 801A, quad word 0 is transferred using a single transfer and quad words 1 through 4 and 5 through 8 are respective bursts of four transfers corresponding to the threshold setting of four, namely single transfer 806A, bursts of four transfer 806B, and burst of four transfer 806C.

Commands 801B through 801D are the same as write command 801A, except the starting address for each is successively been moved one quad word down, namely to the right. Thus, command 801B after command translation 805 includes a burst of two transfer 807A, a burst of four transfer 807B, and a burst of three transfer 807D, for respectively transferring quad words 0 and 1, 2 through 5, and 6 through 8. The sequences of broken up commands for sequence of commands 802C and 802D follow from the above description where the starting address is respectively associated with command 801C and 801D follow form the above description, namely a burst of three transfer 808A, a burst of four transfer 808B, and a burst of two transfer 808C for command translation 802C; and a burst of four transfer 809A, a burst of four transfer 809B, and a single transfer 809C for command translation 802D.

As previously indicated read and write operations operate differently, so the concept of a read burst threshold of SPLB interface 213 does not work like that of a write burst threshold for such interface. In a read burst, the FIFO threshold in SPLB interface 213 works in a reverse manner to trigger the generation of a read burst command. Instead of using write data FIFO occupancy to trigger generation of a fixed length write burst, read data FIFO non-occupancy values may be used to trigger generation of a fixed length read burst.

Thus a long read burst command may be broken down into smaller fixed length commands, and a read burst command may be sent out only if the read data FIFO in SPLB interface 213 has accumulated sufficient free space to accommodate the anticipated read data burst. However, address alignment as previously described with write burst translation also applies to read burst translation.

Similar to a write burst translation operation, a read burst translation operation as previously indicated includes a three bit configurable threshold register, namely one for SPLB interface 213 and one for memory controller interface 212 which are both part of SPLB interface 213. Command translation for a read burst follows from that described for a write burst with respect to FIG. 6.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for command translation, comprising:
    having a slave processor local bus bridge as part of a processor block core that is embedded in a host integrated circuit;
    setting a data size threshold to allow access by the slave processor local bus bridge to a crossbar switch device of the processor block core;
    having a master device coupled to the slave processor local bus bridge;
    the master device capable of having any of a plurality of command bus widths;
    issuing a burst command via a command bus from the master device for receipt by the slave processor local bus bridge;
    the command bus having a command bus width of the plurality of command bus widths;
    converting the burst command to a native bus width of a slave processor block coupled to receive the burst command if the command bus width is not equal to the native bus width;
    translating the burst command if execution of the burst command will exceed the data size threshold;
    passing the burst command without the translating if the execution of the burst command will not exceed the data size threshold; and
    requesting access by the slave processor local bus bridge to the crossbar switch device of the processor block core after all write data for the burst command is buffered in the slave processor local bus bridge responsive to the burst command being passed without the translating.

2. The method according to claim 1, wherein
    the data size threshold is a write data size threshold; and
    the burst command is for a write operation.

3. The method according to claim 1, further comprising:
    requesting access by the slave processor local bus bridge to the crossbar switch device of the processor block core after all write data for a burst transaction associated with the burst command is buffered in the slave processor local bus bridge, the translating comprising generating the burst transaction using the data size threshold and a starting address of the burst command.

4. The method according to claim 3, wherein the burst transaction is one of a plurality of burst transactions defined by the translating, the translating comprising segmenting the burst command into at least the plurality of burst transactions.

5. The method according to claim 3, wherein the burst transaction is one of a plurality of transactions defined by the translating, the translating comprising segmenting the burst command into the plurality of transactions including the burst transaction and at least one single transfer transaction.

6. The method according to claim 5, further comprising bit packing the at least one single transfer transaction to fill the native bus width.

7. The method according to claim 1, wherein the native bus width is a native command bus width equal in bitwidth to a native data bus width of the slave processor block.

8. The method according to claim 1, further comprising:
    requesting access by the slave processor local bus bridge to the crossbar switch device of the processor block core after a sufficient amount of buffer space is available in the slave processor local bus bridge for all read data for complete execution of the burst command when passed without the translating.

9. The method according to claim 8, wherein:
    the burst command is for a read operation; and
    the data size threshold is a read data size threshold.

10. The method according to claim 1, further comprising:
    requesting access by the slave processor local bus bridge to the crossbar switch device of the processor block core after all read data for a burst transaction associated with the burst command is capable of being buffered in available buffer space in the slave processor local bus bridge, the translating comprising generating the burst transaction using the data size threshold and a starting address of the burst command.

11. The method according to claim 10, wherein the burst transaction is one of a plurality of burst transactions defined by the translating, the translating comprising segmenting the burst command into at least the plurality of burst transactions.

12. The method according to claim 10, wherein the burst transaction is one of a plurality of transactions defined by the translating, the translating comprising segmenting the burst command into the plurality of transactions including the burst transaction and at least one single transfer transaction.

13. The method according to claim 12, further comprising bit packing the at least one single transfer transaction to fill the native bus width.

14. A method of command translation, comprising:
receiving a read burst command to a first processor block interface;
obtaining a first read data size threshold to request access to a crossbar switch coupled to the first processor block interface;
translating the read burst command into at least one read burst portion responsive to the read burst command exceeding the first read data size threshold;
not translating the read burst command responsive to the read burst command not exceeding the first read data size threshold;
determining if sufficient buffer space in association with the first processor block interface is available for completion of either the read burst command or the at least one read burst portion;
if the buffer space is sufficient for completion of the read burst command, requesting access of the crossbar switch for execution of the read burst command via a second interface coupled to the crossbar switch; and
if the buffer space is sufficient for completion of the at least one read burst portion, requesting access of the crossbar switch for execution of the at least one read burst portion via the second interface coupled to the crossbar switch.

15. The method according to claim 14, further comprising:
receiving a write burst command to the first processor block interface;
obtaining a first write data size threshold to request access to the crossbar switch coupled to the first processor block interface;
translating the write burst command into at least one write burst portion responsive to the write burst command exceeding the first write data size threshold;
not translating the write burst command responsive to the write burst command not exceeding the first write data size threshold;
determining if all write data is buffered in association with the first processor block interface for completion of either the write burst command or the at least one write burst portion;
if the write data is sufficient for completion of the write burst command, requesting access of the crossbar switch for execution of the write burst command via the second interface coupled to the crossbar switch; and
if the write data is sufficient for completion of the at least one write burst portion, requesting access of the crossbar switch for execution of the at least one write burst portion via the second interface coupled to the crossbar switch.

16. The method according to claim 15, wherein:
the translating the read burst command includes segmenting the read burst command into the at least one read burst portion using at least the first read data size threshold and a read starting address; and
the translating the write burst command includes segmenting the write burst command into the at least one write burst portion using at least the first write data size threshold and a write starting address.

17. The method according to claim 16, wherein:
the translating the read burst command further includes using a read burst length for the segmenting of the read burst command into the at least one read burst portion; and
the translating the write burst command further includes using a write burst length for the segmenting the write burst command into the at least one write burst portion.

18. The method according to claim 17, wherein the first read data size threshold is independent of the first write data size threshold.

19. The method according to claim 17, wherein:
the segmenting of the read burst command further includes generating at least one single read transfer transaction; and
the segmenting of the write burst command further includes generating at least one single write transfer transaction.

* * * * *